(12) United States Patent
Vukanti et al.

(10) Patent No.: US 12,492,819 B2
(45) Date of Patent: Dec. 9, 2025

(54) GAS TURBINE ENGINE FUEL NOZZLE HAVING A SECONDARY FUEL PASSAGE THROUGH A SWIRLER

(71) Applicant: General Electric Company, Evendale, OH (US)

(72) Inventors: Perumallu Vukanti, Bengaluru (IN); Pradeep Naik, Bengaluru (IN); Clayton S. Cooper, Evendale, OH (US); Michael A. Benjamin, Cincinnati, OH (US); Michael T. Bucaro, Arvada, CO (US); Manampathy G. Giridharan, Evendale, OH (US); Steven C. Vise, West Chester, OH (US); Ajoy Patra, Bengaluru (IN); Saket Singh, Bengaluru (IN); R Narasimha Chiranthan, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/805,691

(22) Filed: Aug. 15, 2024

(65) Prior Publication Data

US 2024/0401809 A1    Dec. 5, 2024

Related U.S. Application Data

(63) Continuation of application No. 18/350,205, filed on Jul. 11, 2023, now Pat. No. 12,085,281, which is a
(Continued)

(30) Foreign Application Priority Data

Dec. 21, 2021    (IN) .............................. 202111059707

(51) Int. Cl.
F23R 3/14    (2006.01)
F23R 3/28    (2006.01)

(52) U.S. Cl.
CPC ................. F23R 3/14 (2013.01); F23R 3/286 (2013.01)

(58) Field of Classification Search
CPC ................................... F23R 3/14; F23R 3/286
See application file for complete search history.

(56) References Cited

U.S. PATENT DOCUMENTS 3,917,173 A    11/1975   Singh
3,937,011 A    2/1976    Caruel et al.
(Continued)

FOREIGN PATENT DOCUMENTS

CN    101893242 A    11/2010
CN    103874887 A    6/2014
(Continued)

OTHER PUBLICATIONS

First Office Action issued in corresponding Chinese Application No. 202211103480.5 dated Mar. 3, 2025, together with English language translation retrieved from the Global Dossier.
(Continued)

Primary Examiner — William H Rodriguez
(74) Attorney, Agent, or Firm — Carter, DeLuca & Farrell LLP (57) ABSTRACT

An engine can utilize a combustor to combust fuel to drive the engine. A fuel nozzle assembly can supply fuel to the combustor for combustion or ignition of the fuel. The fuel nozzle assembly can include a swirler and a fuel nozzle to supply a mixture of fuel and air for combustion, which can supply a primary fuel supply and a secondary fuel supply. Increasing efficiency and reducing emission require the use of alternative fuels, which combust at higher temperatures or
(Continued)

burn at faster burn speeds than traditional fuels, requiring improved fuel introduction without the occurrence of flame holding or flashback.

20 Claims, 9 Drawing Sheets

Related U.S. Application Data continuation of application No. 17/682,373, filed on Feb. 28, 2022, now Pat. No. 11,725,819.

(56) References Cited

U.S. PATENT DOCUMENTS

| | | | |
|---|---|---|---|
| 3,946,552 A * | 3/1976 | Weinstein | F23R 3/14 239/404 |
| 5,394,688 A | 3/1995 | Amos | |
| 5,490,378 A | 2/1996 | Berger et al. | |
| 5,505,045 A | 4/1996 | Lee et al. | |
| 5,778,676 A | 7/1998 | Joshi et al. | |
| 6,244,051 B1 | 6/2001 | Zarzalis et al. | |
| 6,367,262 B1 | 4/2002 | Mongia et al. | |
| 7,878,000 B2 | 2/2011 | Mancini et al. | |
| 8,387,391 B2 | 3/2013 | Patel et al. | |
| 8,516,820 B2 | 8/2013 | Ramier et al. | |
| 8,607,571 B2 | 12/2013 | Williams et al. | |
| 9,581,334 B2 | 2/2017 | Bourgois | |
| 10,184,665 B2 | 1/2019 | Benjamin et al. | |
| 10,612,782 B2 | 4/2020 | Toon et al. | |
| 10,731,861 B2 | 8/2020 | Schlein | |
| 11,592,182 B1 | 2/2023 | Rangrej et al. | |
| 11,725,819 B2 * | 8/2023 | Vukanti | F23R 3/286 60/737 |
| 12,085,281 B2 * | 9/2024 | Vukanti | F23D 11/107 |
| 2003/0131600 A1 | 7/2003 | David et al. | |
| 2004/0025508 A1 | 2/2004 | Calvez et al. | |
| 2004/0103668 A1 | 6/2004 | Bibler et al. | |
| 2007/0277528 A1 | 12/2007 | Homitz et al. | |
| 2010/0031661 A1 | 2/2010 | Varatharajan et al. | |
| 2010/0126176 A1 * | 5/2010 | Kim | F23R 3/14 239/399 |
| 2010/0251720 A1 | 10/2010 | Pelletier et al. | |
| 2010/0263382 A1 | 10/2010 | Mancini et al. | |
| 2011/0000214 A1 | 1/2011 | Helmick et al. | |
| 2011/0088401 A1 | 4/2011 | Mancini et al. | |
| 2016/0363320 A1 | 12/2016 | Benjamin et al. | |
| 2017/0248318 A1 | 8/2017 | Kulkarni | |
| 2017/0299190 A1 | 10/2017 | Patel et al. | |
| 2017/0363291 A1 | 12/2017 | Laster et al. | |
| 2018/0128489 A1 | 5/2018 | Boardman et al. | |
| 2018/0128490 A1 | 5/2018 | Boardman et al. | |
| 2018/0313542 A1 | 11/2018 | Leparoux et al. | |
| 2019/0063752 A1 | 2/2019 | Stevens et al. | |
| 2019/0093895 A1 | 3/2019 | Lind et al. | |
| 2019/0203929 A1 | 7/2019 | Benjamin et al. | |
| 2021/0172413 A1 | 6/2021 | Snyder | |
| 2021/0207808 A1 | 7/2021 | Mishra et al. | |
| 2023/0053389 A1 | 2/2023 | Vukanti et al. | |
| 2023/0194092 A1 | 6/2023 | Naik et al. | |
| 2023/0194093 A1 | 6/2023 | Bucaro et al. | |
| 2023/0194095 A1 | 6/2023 | Vukanti et al. | |
| 2023/0204214 A1 | 6/2023 | Giridharan et al. | |

FOREIGN PATENT DOCUMENTS

| | | |
|---|---|---|
| CN | 113701195 A | 11/2021 |
| DE | 102011116317 A1 | 4/2013 |
| EP | 3104080 A1 | 12/2016 |
| EP | 1909030 B1 | 1/2017 |
| GB | 2451517 A1 | 2/2009 |
| WO | 2013056819 A1 | 4/2013 |

OTHER PUBLICATIONS

European Search Report issued in corresponding application EP 25191675.5 dated Sep. 1, 2025.

* cited by examiner

GAS TURBINE ENGINE FUEL NOZZLE HAVING A SECONDARY FUEL PASSAGE THROUGH A SWIRLER

CROSS-REFERENCE TO RELATED APPLICATION(S)

This application claims priority to and the benefit of U.S. patent application Ser. No. 18/350,205, filed Jul. 11, 2023, currently allowed, which claims priority to and the benefit of U.S. patent application Ser. No. 17/682,373, filed Feb. 28, 2022, now issued as U.S. Pat. No. 11,725,819 on Aug. 15, 2023, which claims priority to and the benefit of Indian Provisional Patent Application No. 202111059707, filed Dec. 21, 2021, with the entirety of each being incorporated herein by reference.

FIELD

The present subject matter relates generally to combustor for a turbine engine, the combustor having one or both of a fuel nozzle and a swirler.

BACKGROUND

An engine, such as a turbine engine that includes a turbine, is driven by combustion of a combustible fuel within a combustor of the engine. The engine utilizes a fuel nozzle to inject the combustible fuel into the combustor. A swirler provides for mixing the fuel with air in order to achieve efficient combustion.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Aspects of the disclosure herein are directed to a fuel nozzle and swirler architecture located within an engine component, and more specifically to a fuel nozzle structure configured for use with fuels operating at heightened combustion temperatures and burn speeds, such as hydrogen or hydrogen-based fuels, which can provide for reduced NOx or carbon emissions. Efficiency and emission needs require fuels that burn hotter and faster than traditional fuels. Such fuels generate challenges relating to flame holding or flashback due to the higher flame speed with high-temperature fuels. Current combustors include a durability risk when using high-temperature fuels due to flame holding or flashback on combustor components. For purposes of illustration, the present disclosure will be described with respect to a turbine engine, while other residential or commercial applications are contemplated.

Reference will now be made in detail to the fuel nozzle and swirler architecture, and in particular for use with an engine, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "forward" and "aft" refer to relative positions within an engine or vehicle, and refer to the normal operational attitude of the engine or vehicle. For example, with regard to a turbine engine, a refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

The terms "forward" and "aft" refer to relative positions within an engine or vehicle, and refer to the normal operational attitude of the engine or vehicle. For example, with regard to a turbine engine, forward refers to a position closer to an engine inlet and aft refers to a position closer to an engine nozzle or exhaust.

The term "flame holding" relates to the condition of continuous combustion of a fuel such that a flame is maintained along or near to a component, and usually a portion of the fuel nozzle assembly as described herein, and "flashback" relate to a retrogression of the combustion flame in the upstream direction.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The combustor introduces fuel from a fuel nozzle, which is mixed with air provided by a swirler, and then combusted within the combustor to drive the engine. Increases in efficiency and reduction in emissions have driven the need to use fuel that burns cleaner or at higher temperatures, which can also include increased burn speeds. There is a need to improve durability of the combustor under these operating parameters, such as improved flame control to prevent flame holding on the fuel nozzle and swirler components.

Figure 1:
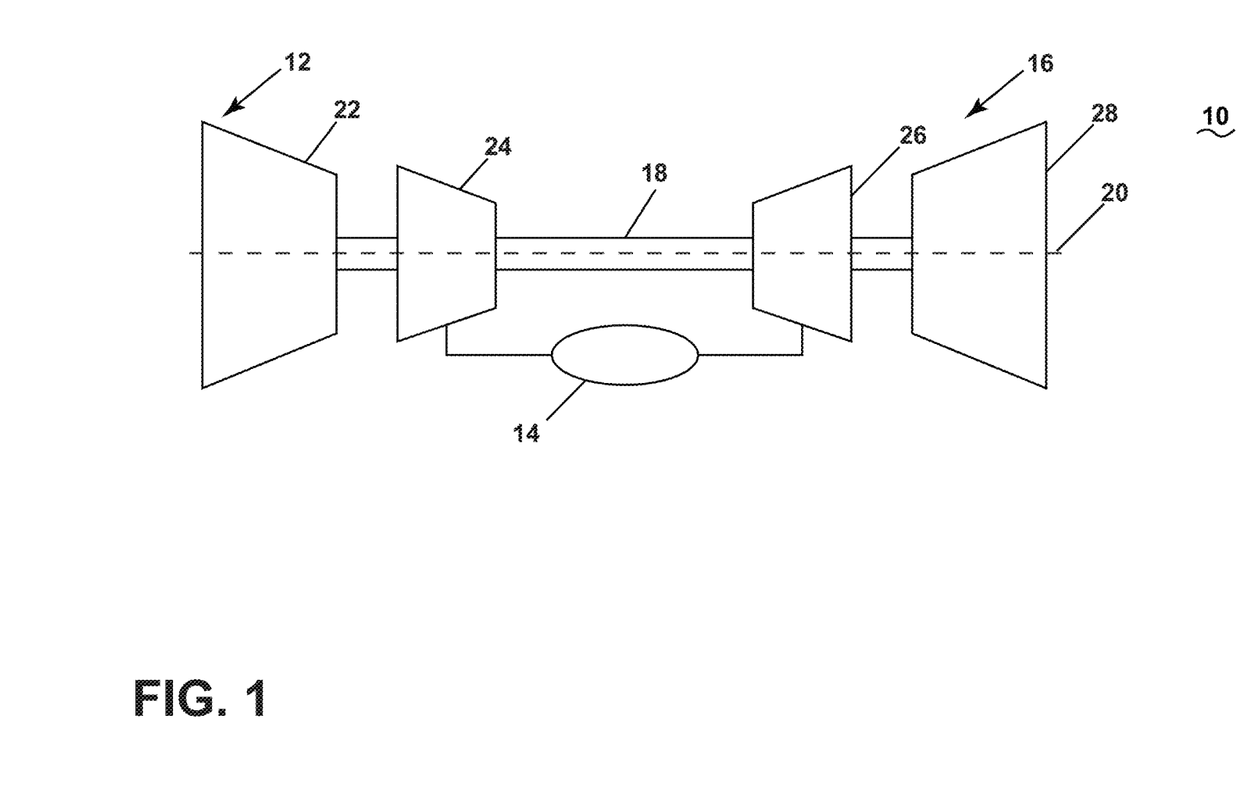
FIG. 1 is a schematic cross-sectional view of an engine in accordance with an exemplary embodiment of the present disclosure.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor and turbine sections 12, 16, such that rotation of one affects the rotation of the other, and defines a rotational axis 20 for the turbine engine 10.

The compressor section 12 can include a low-pressure (LP) compressor 22, and a high-pressure (HP) compressor 24 serially fluidly coupled to one another. The turbine section 16 can include an LP turbine 28, and an HP turbine 26 serially fluidly coupled to one another. The drive shaft 18 can operatively couple the LP compressor 22, the HP compressor 24, the LP turbine 28 and the HP turbine 26 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
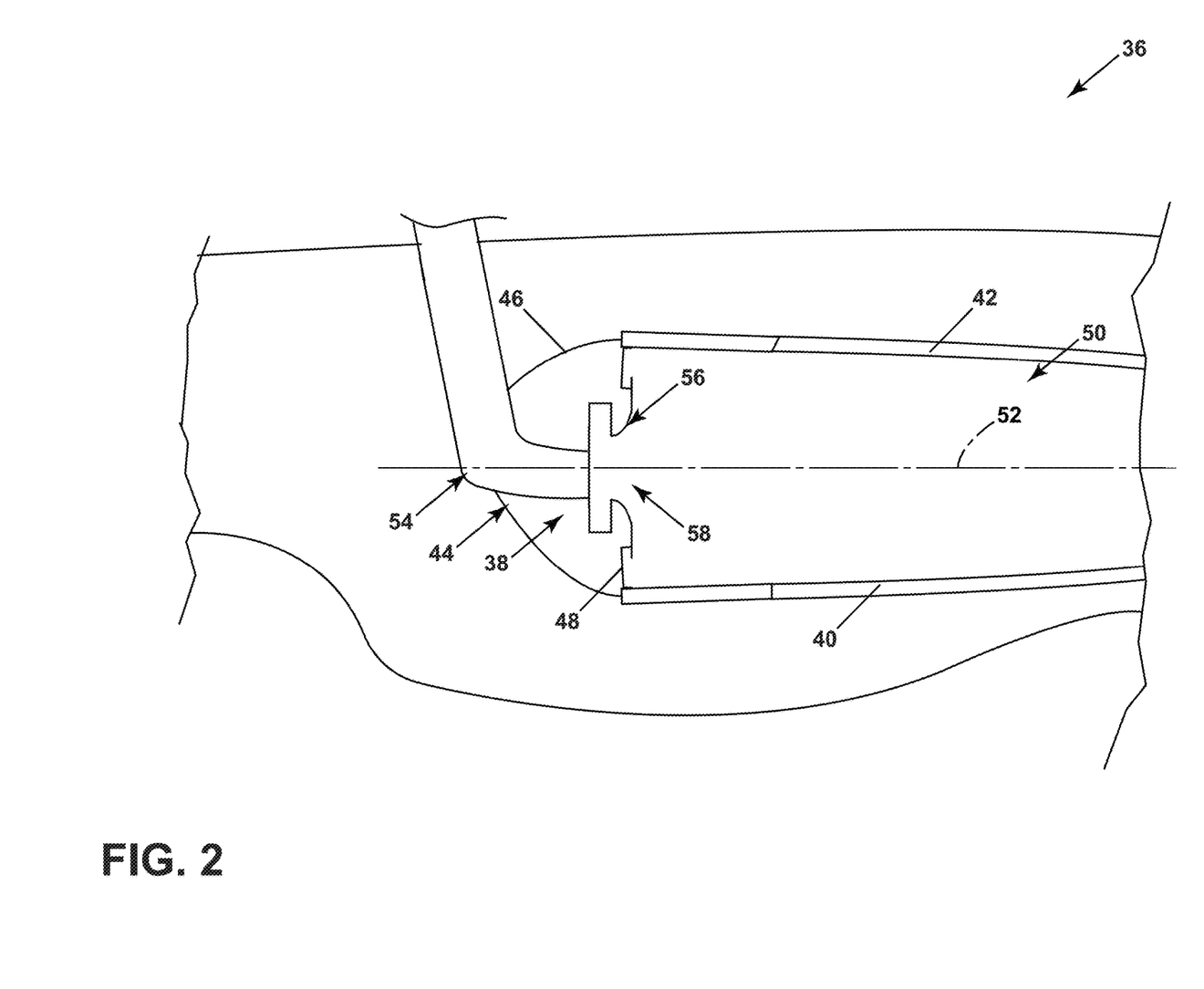
FIG. 2 is a schematic cross-sectional view of a combustor for the turbine engine of FIG. 1 in accordance with an exemplary embodiment of the present disclosure.

FIG. 2 depicts a cross-section view of a generic combustor 36 suitable for use as the combustion section 14 of FIG. 1. The combustor 36 can include an annular arrangement of fuel nozzle assemblies 38 for providing fuel to the combustor. It should be appreciated that the fuel nozzle assemblies 38 can be organized as in an annular arrangement including multiple fuel injectors. The combustor 36 can have a can, can-annular, or annular arrangement depending on the type of engine in which the combustor 36 is located. The combustor 36 can include an annular inner combustor liner 40 and an annular outer combustor liner 42, a dome assembly 44 including a dome 46 and a deflector 48, which collectively define a combustion chamber 50 about a longitudinal axis 52. At least one fuel supply 54 is fluidly coupled to the combustion chamber 50 to supply fuel to the combustor 36. The fuel supply 54 can be disposed within the dome assembly 44 upstream of a flare cone 56 to define a fuel outlet 58. A swirler can be provided at the fuel nozzle assemblies 38 to swirl incoming air in proximity to fuel exiting the fuel supply 54 and provide a homogeneous mixture of air and fuel entering the combustor 36.

Figure 3:
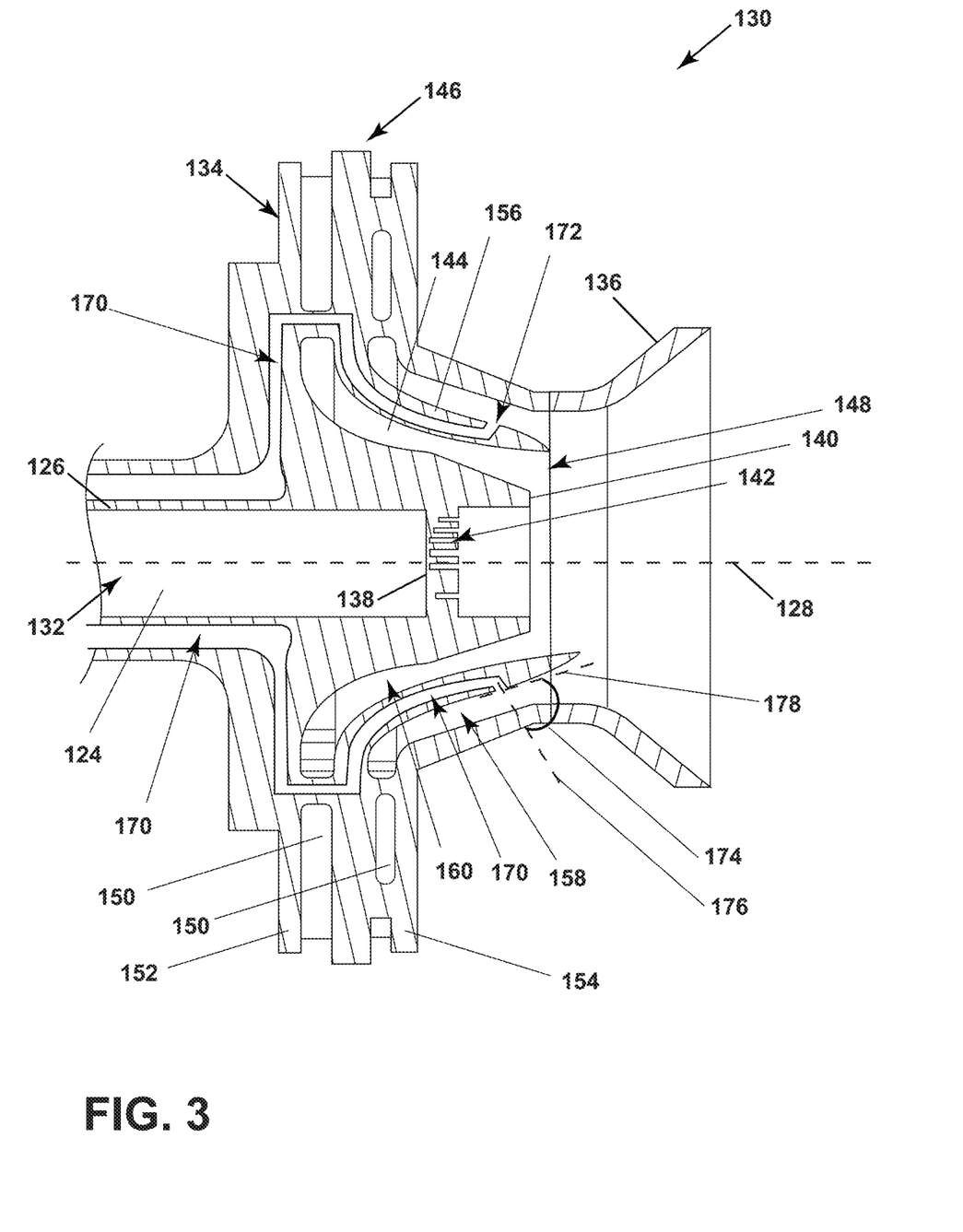
FIG. 3 is a cross-sectional view of a fuel nozzle assembly including a swirler with a splitter having a fuel passage with an outlet on a radially exterior surface of the splitter in accordance with an exemplary embodiment of the present disclosure.

FIG. 3 illustrates a fuel nozzle assembly 130, suitable for use in the combustor 36 as the fuel nozzle assembly 38, for example, including a fuel nozzle 132, with an outer wall 126 surrounding a fuel passage 124 defining a longitudinal axis 128, a swirler 134, and a flare cone 136. The fuel nozzle 132 can be a cylindrical conduit, while non-cylindrical conduits are contemplated, including a nozzle cap 138 prior to a nozzle tip 140. The nozzle cap 138 can include a set of openings 142 which may or may not impart a swirl or tangential component to the fuel emitted from the nozzle tip 140. As shown, the openings 142 are oriented tangentially, such that they appear to end within the cap 138, while it should be appreciated the openings 142 extend fully through the cap 138 such that fuel can pass through the openings 142. The nozzle cap 138 can be spaced from the nozzle tip 140. Such spacing provides for developing a stable axial component for the fuel supplied from the fuel passage 124 before emission from the nozzle tip 140. The fuel nozzle 132 and the swirler 134 can be coupled together, or formed as a single unitary component, such as by additive manufacturing.

The swirler 134 can be annular, circumscribing the fuel nozzle 132, and can include an air passage 144 extending from an inlet 146 to an outlet 148. A set of vanes 150 are arranged circumferentially within the air passage 144 to impart a swirl or tangential component to an airflow passing through the air passage 144. The vanes 150 can extend between a forward wall 152 and an aft wall 154.

A splitter 156 extends from the vanes 150 in the downstream direction. The splitter 156 can separate the air passage 144 into a radially outer passage 158 and a radially inner passage 160. It should be appreciated that the swirler 134 can be alternatively described as two sets of swirlers, with a first swirler defined between the forward wall 152 and the splitter 156, and a second swirler defined between the splitter 156 and the aft wall 154. The first swirler can include a different angle for vanes within the first swirler, as opposed to vanes of the second swirler, which can be used to define different velocity profiles along different portions of the swirler. Additionally, the radially inner passage 160 and the radially outer passage 158, or the first swirler and the second swirler, can be differently sized to provide differing velocities at the passage exit, while reducing or eliminating flow separation.

A fuel passage 170 extends through the walls of the fuel nozzle 132 and into the forward wall 152 of the swirler 134. In one example, the fuel passage 170 can be an annular passage, while it is contemplated that the fuel passage 170 can be arranged as a set of discrete passages in annular arrangement. The fuel passage 170, or discrete fuel passages, can have any cross-sectional shape, such as circular or oval in non-limiting examples. The fuel passage 170 can further extend through the vanes 150 at the forward wall 152, and then extend into the splitter 156 through the vanes 150. The fuel passage 170 can exhaust to the radially outer passage 158 at an outlet 172. While an inlet is not shown, the fuel passage 170 can be supplied from a fuel source common with the fuel nozzle 132, or even fed from the fuel nozzle 132 directly, or that the fuel passage 170 is fed from an independent fuel manifold different or common with the main fuel supply to the fuel nozzle 132.

The fuel nozzle 132 can define a primary fuel circuit while the fuel passage 170 can define a secondary fuel circuit. The primary fuel circuit can provide a swirling flow of fuel from the nozzle tip 140 and the secondary fuel circuit can provide a non-swirling flow of fuel, while swirling or non-swirling flows are contemplated for any of the primary fuel supply, the secondary fuel supply, the radially outer passage 158, and the radially inner passage 160. A swirling flow at the nozzle tip 140 can provide for reducing or eliminating flashback or flame holding at the nozzle tip 140, while a non-swirling fuel flow can provide for a limited spread of the fuel in the radial direction, while the primary fuel flow is centrally maintained. The swirling flow can further permit a stable flame generated and maintained in the combustor, while avoiding flash back, while a secondary fuel flow can provide for greater control of radial provision of the fuel, which can reduce or eliminate flame holding or flame scrubbing on the flare cone or combustor liners. Additionally, the air provided in the radially outer passage 158 keeps the fuel away from the flare cone 136, while still providing increased fuel spread. Improved fuel distribution and control thereof in the primary zone of the combustor leads to greater fuel mixing resulting in reduced NOx or carbon emissions.

It is further contemplated that the outlet 172 can be arranged at an angle 174 with respect to the surface of the splitter 156 at the outlet 172. More specifically, in one example, the angle can be defined between a longitudinal axis 176 defined along the outlet 172, relative to a line or plane 178 that is perpendicular to a line normal to a surface defined across the outlet 172. In one example, the angle can be oriented in the downstream direction, relative to the flow of air within the swirler 134. In one example, the angle can be between 10-degrees and 70-degrees, while wider ranges are contemplated, or even an angular orientation in the upstream direction, circumferential direction, tangential direction, or combinations thereof. In one example, the outlet 172 can include a tangential component, such that the fuel emitted from the outlet 172 is aligned with the swirling air from the swirler 134. It should be appreciated that tailoring the outlet angle for the secondary supply of fuel can be used to affect the swirling airflow, or limiting such an effect on the swirling airflow. For example, injecting the fuel at a higher value angle can provide for increased radial spread for the fuel, as well as increased turbulence to improve mixing. Where the injecting the secondary fuel at a lesser value angle can provide for reduced shear, which can limit radial spread of fuel and reduce flame scrubbing on the combustor liner. Further still, where the injection is oriented at a tangential angle, shear can be further reduced relative to the swirling airflow from the swirler 134.

Figure 4:
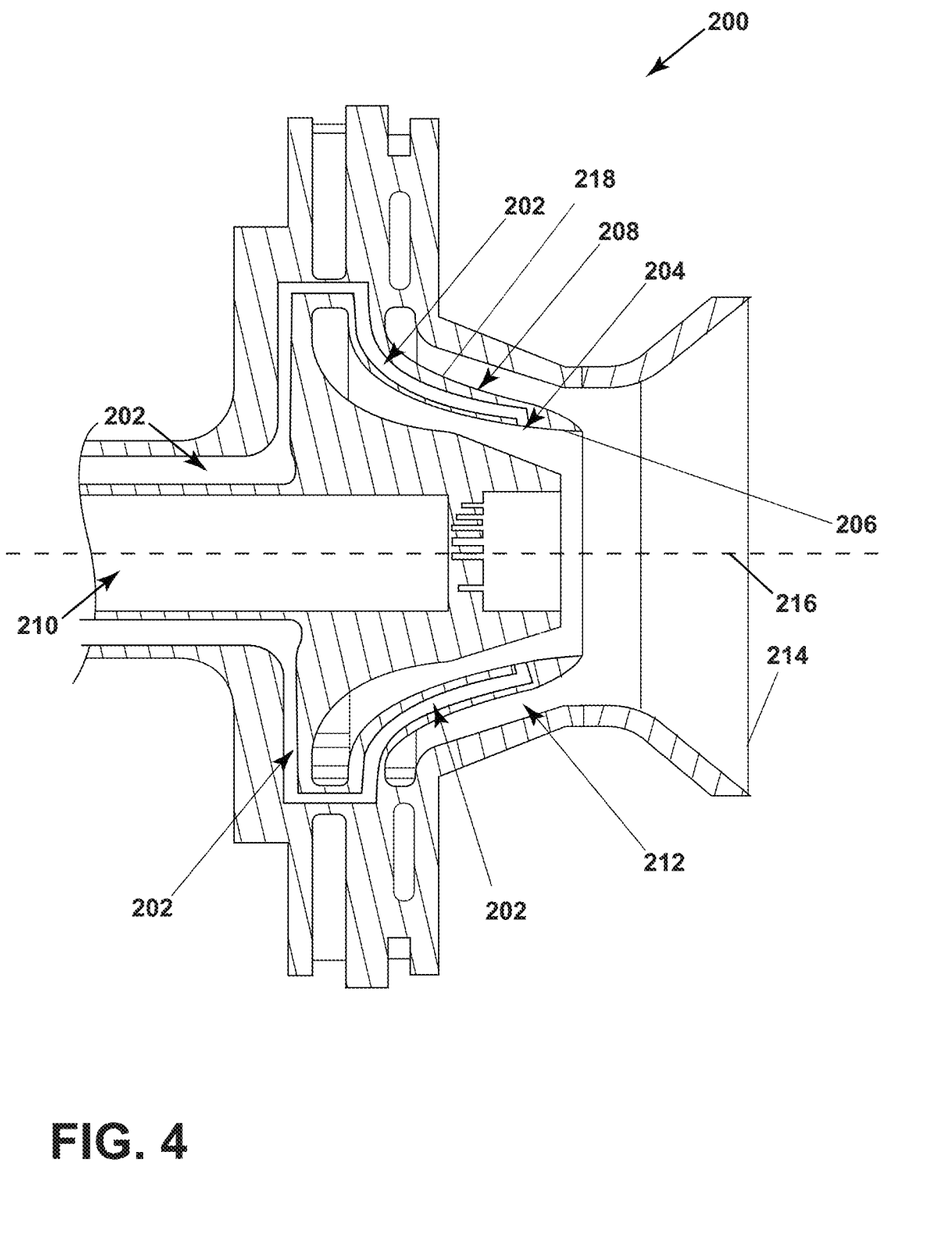
FIG. 4 is a cross-sectional view of another fuel nozzle assembly including a swirler with a splitter having a fuel passage with an outlet on a radially interior surface of the splitter in accordance with an exemplary embodiment of the present disclosure.

FIG. 4 shows an alternative fuel nozzle assembly 200 defining a longitudinal axis 216, which can be substantially similar to the fuel nozzle assembly 130 of FIG. 3, with the fuel nozzle assembly 200 including an annular secondary fuel circuit 202 that includes an outlet 204 on an inner surface 206 of a splitter 208. The fuel injection from the inner surface 206 provides for greater radial spread of fuel compared to using the primary fuel supply alone, while the primary fuel emitted from a fuel nozzle 210 reduces flame holding and flashback, and provides fuel along the centerline of the fuel nozzle assembly 200. Similar to that of FIG. 3, the swirling flow can further permit a stable flame generated and maintained in the combustor, while avoiding flash back, while a secondary fuel flow can provide for greater control of radial provision of the fuel, which can reduce or eliminate flame holding or flame scrubbing on the flare cone or combustor liners. Airflow within a radially outer passage 212 keeps the secondary fuel emitted from the outlet 204 away from a flare cone 214, providing a greater amount of air emitted from the swirler between the flare cone 214 and the secondary fuel supply, which can increase flare cone durability. It is also contemplated that the outlet 204 can be provided on an outer surface 218 of the splitter 208.

Figure 5:
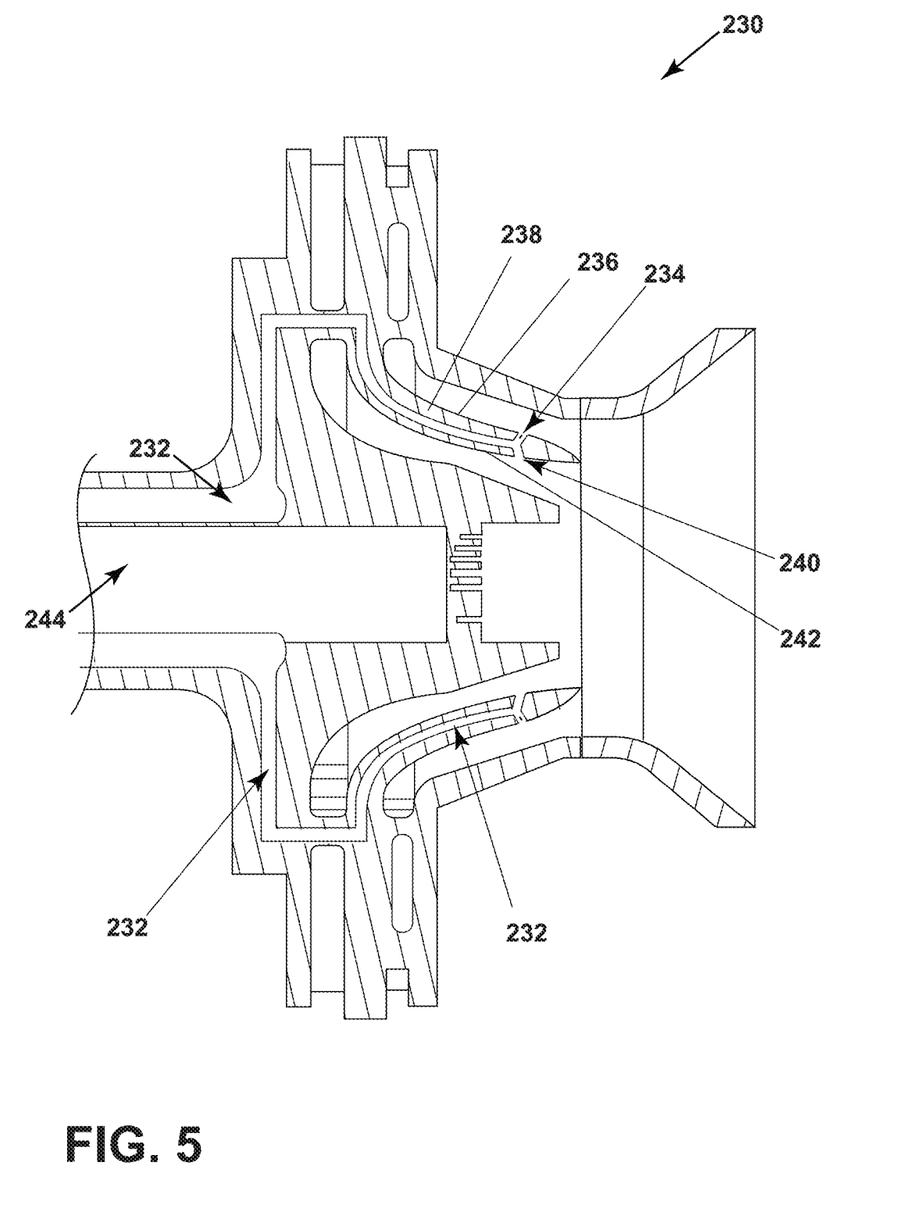
FIG. 5 is cross-sectional view of another fuel nozzle assembly including a swirler with a splitter having a fuel passage with an outlet on both a radially interior and radially exterior surface in accordance with an exemplary embodiment of the present disclosure.

FIG. 5 shows another alternative fuel nozzle assembly 230, which can be substantially similar to the fuel nozzle assemblies 130, 200 of FIGS. 3 and 4, with the fuel nozzle assembly 230 including a secondary fuel passage 232 with a first outlet 234 on an outer surface 236 of a splitter 238, and a second outlet 240 on an inner surface 242 of the splitter 238. In this way, the secondary fuel passage 232 can split or otherwise separate to feed both the first and second outlets 234, 240.

Injecting the fuel on both the inner and outer portions of the splitter 238 provides for further fuel spread for the secondary flow, while maintaining a high velocity profile along a central fuel nozzle passage 244, which can reduce flame holding and flashback, while providing increased radial fuel spread. Increased fuel spread in the primary combustor zone increases uniform fuel distribution and reduces NOx emissions, while reducing component temperature by reducing flame holding or flashback.

It should be appreciated that the outlets 234, 240 can be aligned or unaligned, relative to the axial extent of the fuel nozzle assembly 230, or the circumferential direction. Additionally, the outlets 234, 240 can be staggered relative to one another, such as an axial stagger, a radial stagger, or a circumferential stagger. It is further contemplated that the outlets are arranged in circumferential rows, relative to the circumferential arrangement of the splitter 238, while the outlet can be formed as a circumferential slot, or series of slots, formed into the splitter 238. It is further contemplated that more than two sets of outlets can be utilized, such that any number of outlets is contemplated in any arrangement. Further still, the outlets can be arranged into sets of rows while being limited to either the radially outer wall of the swirler or the radially inner wall of the swirler, while further combinations thereof are contemplated. Different outlet arrangements can be utilized to control different fuel spread profiles, velocity profiles, or combinations thereof, which can be utilized to increase radial fuel spread, while minimizing or eliminating the occurrence of flame holding or flashback on the fuel nozzle assembly 230. For example, the outlets 234, 240 can be emitted with a tangential component, which can be tailored to the local swirl from the swirler.

Figure 6:
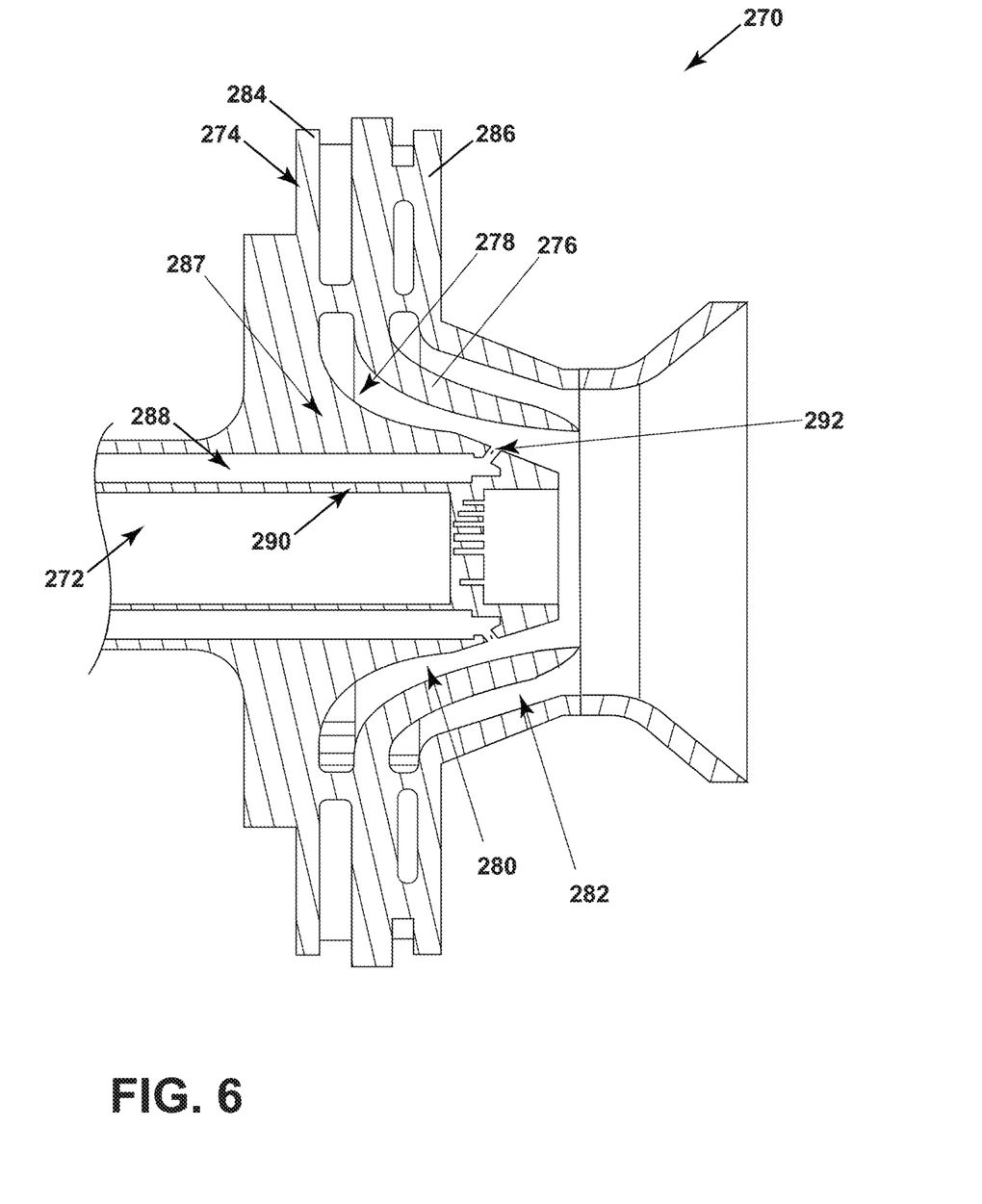
FIG. 6 is a cross-sectional view of yet another fuel nozzle assembly including a fuel nozzle with a nozzle wall passage with an exterior outlet exhausting to a swirler in accordance with an exemplary embodiment of the present disclosure.

FIG. 6 shows another exemplary fuel nozzle assembly 270 that includes a fuel nozzle 272 and a swirler 274. The swirler 274 can include a splitter 276, separating a swirler air passage 278 into a radially inner passage 280 and a radially outer passage 282, with the radially inner passage 280 adjacent to a forward wall 284 and the radially outer passage 282 adjacent to an aft wall 286. The forward wall 284 includes a foot 287 that extends along the fuel nozzle 272 as the swirler 274 turns from radial to axial.

A fuel nozzle wall passage 288 can extend through a wall 290 of the fuel nozzle 272 and exhausting at an outlet 292. The fuel nozzle wall passage 288 can exhaust through the exterior surface of the fuel nozzle wall 290, or through the exterior surface and into the foot 287, exhausting into the radially inner passage 280.

Figure 7:
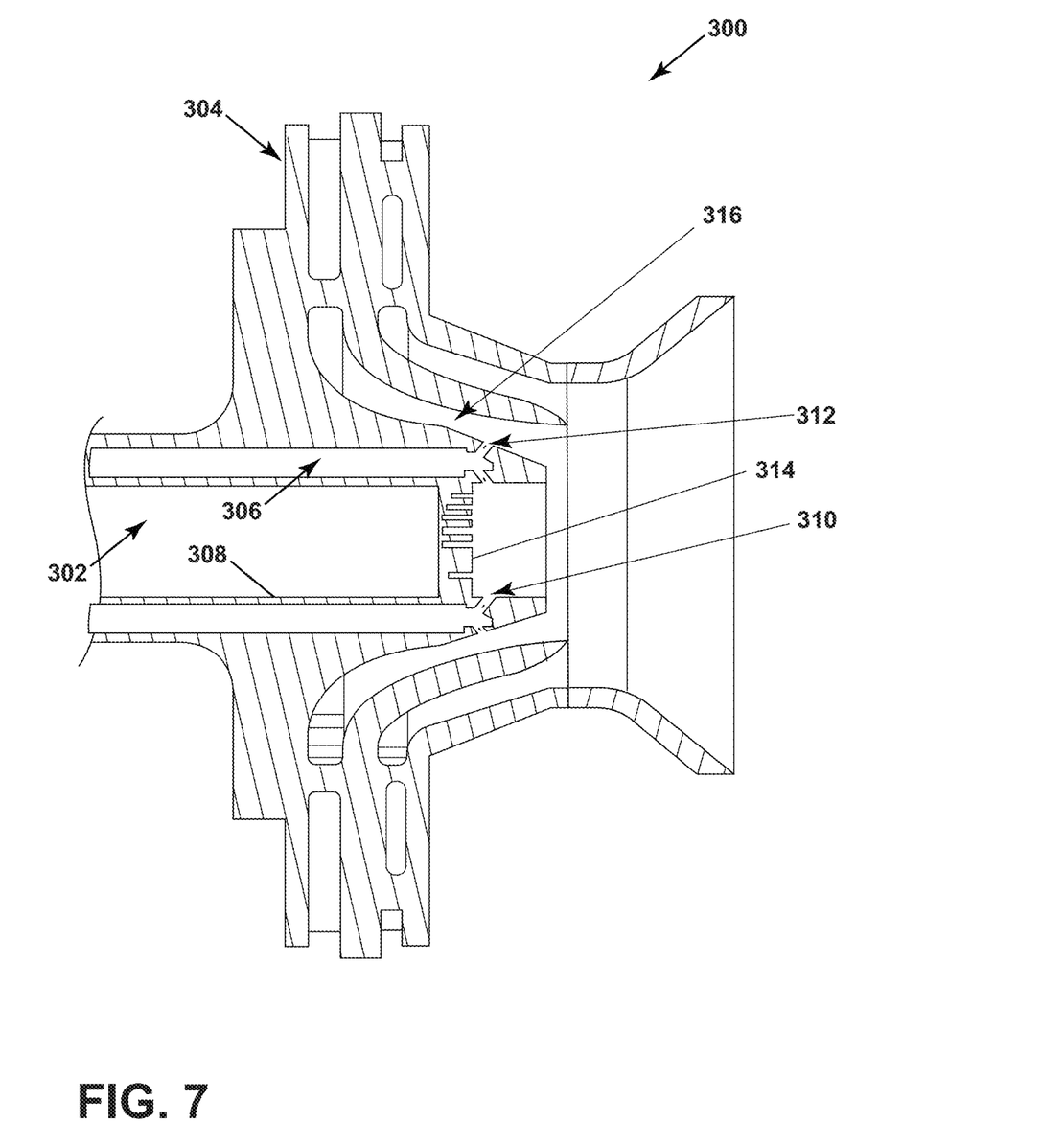
FIG. 7 is a cross-sectional view of yet another fuel nozzle assembly including a fuel nozzle with a nozzle wall passage with an exterior outlet exhausting to a swirler and an interior outlet exhausting within the fuel nozzle in accordance with an exemplary embodiment of the present disclosure.

FIG. 7 shows yet another exemplary fuel nozzle assembly 300 that includes a fuel nozzle 302 and a swirler 304. A fuel nozzle wall passage 306 can extend through the wall 308 of the fuel nozzle 302. The fuel nozzle wall passage 306 can include an interior set of outlets 310 that exhaust into the fuel nozzle 302 aft of a nozzle cap 314, while an exterior set of outlets 312 exhaust into a swirler air passage 316.

Regarding FIGS. 6-7, it should be appreciated that a secondary fuel passage can be provided within the walls of the primary fuel nozzle. The outlets for emitting the secondary fuel can be interior of the fuel nozzle, exterior of the fuel nozzle, or both. The radially outer outlets 312 provide for emitting a secondary fuel which can improve limited fuel spread. The radially inner outlets 310 can impinge upon the primary fuel flow, which can centrally-maintain the primary fuel flow, which provides for reducing flame holding along the tip of the fuel nozzle 302. The radially inner outlets 310 can provide for additional local control of the fuel distribution between the primary fuel supply via the fuel nozzle 272 and the swirler 274, as well as expanding the operating range of fuel provision without increasing size of the fuel nozzle 272.

Regarding outlets on the interior of the fuel nozzle, the outlets can be positioned downstream of a nozzle cap, such that the secondary fuel flow is imparted to the primary fuel flow after the nozzle cap has acted upon the primary fuel flow, such as imparting a swirling component to the flow. Similarly, it is contemplated that the outlets from the secondary fuel nozzle can have a tangential component, such that the secondary fuel is imparted with a swirl or tangential component that can be in the same direction as the primary fuel flow, which can reduce shear between the two flows. Similarly, the exterior outlets can include a tangential component to be in the same direction as the swirler airflow or counter to the airflow to improve radial fuel spread.

It should be further appreciated that the secondary fuel passages of FIGS. 6-7 can be combined or integrated with the secondary fuel passages of FIGS. 3-5, such that multiple secondary fuel passages or circuits exist, with multiple outlet positions or arrangements, or combinations thereof.

Figure 8:
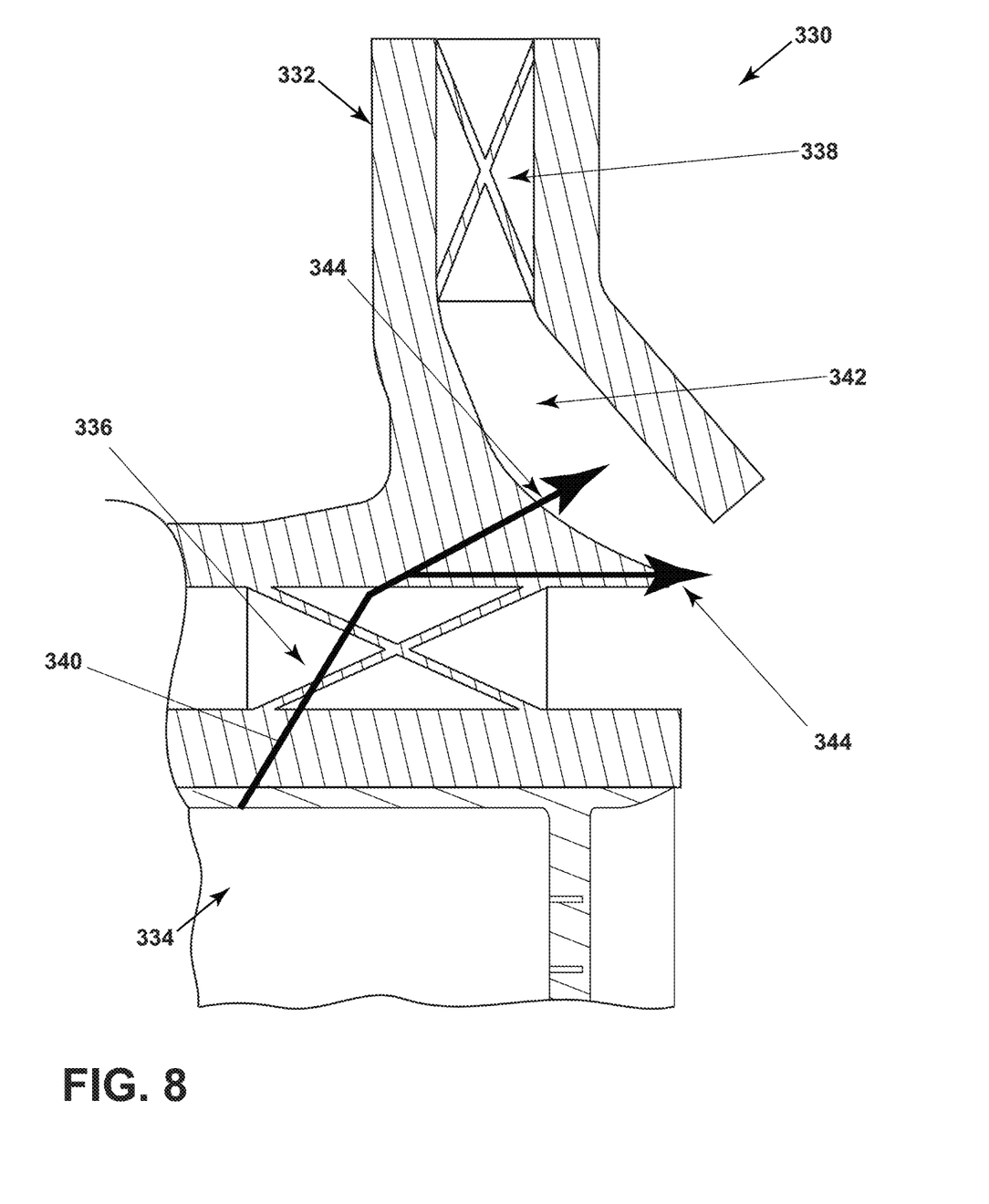
FIG. 8 is a cross-sectional view of a fuel nozzle assembly having an axial swirler, with a fuel passage extending through an axial vane of the axial swirler in accordance with an exemplary embodiment of the present disclosure.

FIG. 8 schematically shows another arrangement for a fuel nozzle assembly 330 including a swirler 332 positioned about a fuel nozzle 334. The swirler 332 can be both an axial swirler, receiving an axial air supply and imparting a tangential component to that axial supply, and a radial swirler, receiving a radial air supply and turning toward an axial orientation as well as imparting a tangential component. It should be appreciated that the fuel nozzle 334 can be a cylindrical supply conduit, while only a portion is shown in the cross-sectional view. The swirler 332 includes a set of circumferentially-arranged axial vanes 336 dedicated to the axial swirler and a set of circumferentially-arranged radial vanes 338 dedicated to the radial swirler, while an arrangement without the radial vanes is contemplated. It should be appreciated that the swirler as described herein can be either or both of an axial and radial type swirler.

A secondary fuel passage 340 can extend through the axial vanes 336 and exhaust into an airflow passage 342 downstream of the radial vanes 338. The secondary fuel can be injected into the airflow passage 342 at an angle, such that a longitudinal axis defined through the secondary fuel passage 340 at an outlet 344 is offset from perpendicular to the wall of the swirler 332 at the outlet 344. It should be appreciated that while two flow paths are shown for the outlets 344, with two different angles of injection, only one outlet is possible, or additional outlets more than that shown, as well as any variation in injection angle. It should be further appreciated that any arrangement of outlets is contemplated, such as aligned rows or set, offset rows or sets, or other arrangements in non-limiting examples, while the outlets can have an axial, radial, or tangential component.

An angular injection can provide for spreading the secondary fuel supply into the airflow while minimizing any flow disruption caused by the injection. Furthermore, the injection can include a tangential or circumferential component, such that the secondary supply of fuel is aligned with the swirl of the airflow within the airflow passage 342. The swirl imparted to the secondary fuel supply can be minimal, which can provide for an increased velocity component along the front wall, which can reduce or eliminate flashback or flame holding along the fuel nozzle or fuel nozzle tip. Furthermore, an inner axial swirler with a lower swirl component can create a high axial velocity component on both swirler passages, which can eliminate flame holding on both the flare cone and the fuel nozzle or swirler. The relative swirl between the radial and axial swirler can improve control of the turbulence in the primary zone of the combustor to increase uniform mixing of the fuel and air, which results in uniform temperature distribution in the primary zone, which reduces NOx emissions. It is further contemplated that the axial vane can generate a higher swirl than the swirler to increase mixing with the primary fuel supply. It is further contemplated that the radial and axial vanes can have the same or opposite swirl, which can be balanced between reduction of flame holding and reduction of NOx emissions.

Figure 9:
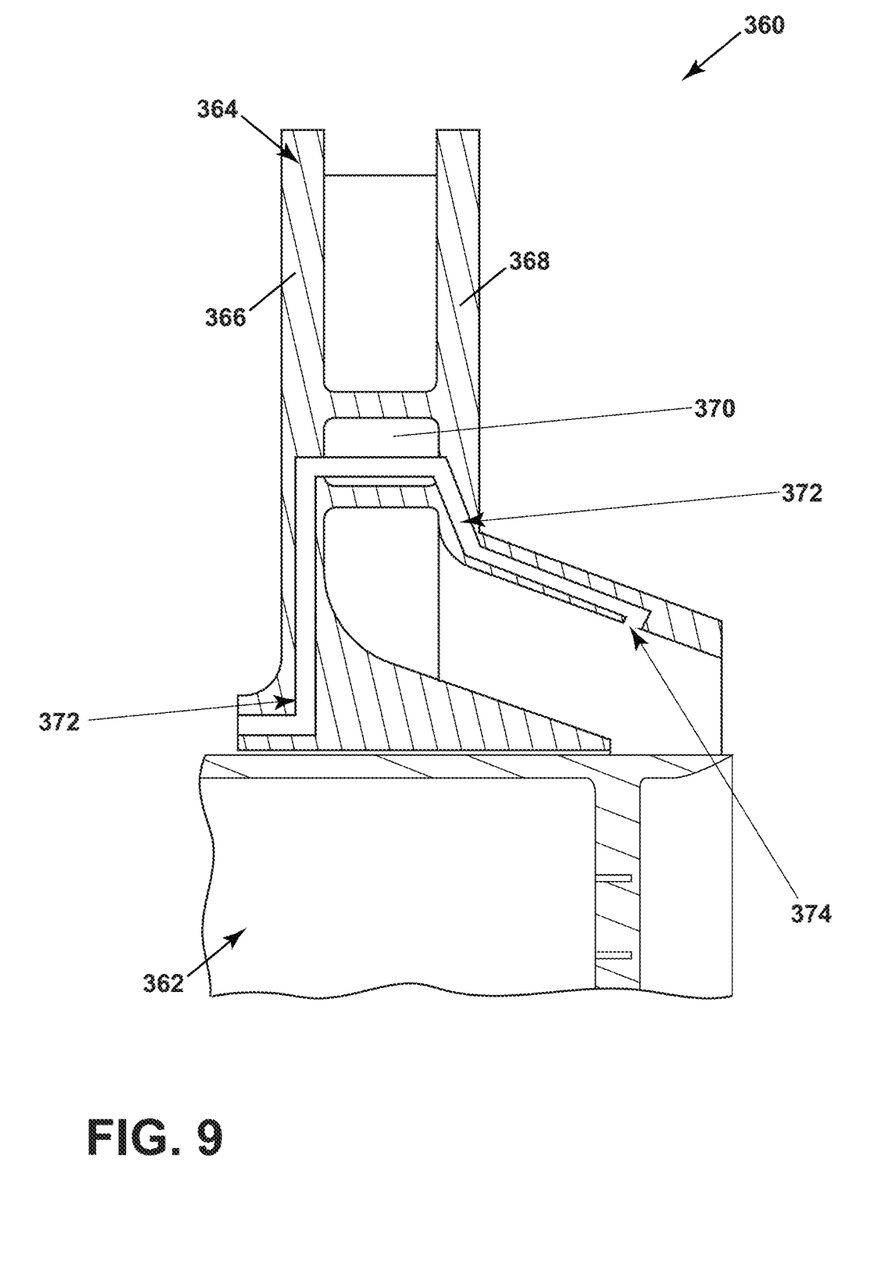
FIG. 9 is a cross-sectional view of a fuel nozzle assembly having a radial swirler, with a fuel passage extending through a vane of the radial swirler in accordance with an exemplary embodiment of the present disclosure.

FIG. 9 shows another exemplary fuel nozzle assembly 360 including a fuel nozzle 362 and a swirler 364. The swirler 364 includes a forward wall 366 and an aft wall 368, with a set of circumferentially-arranged vanes 370 extending between the forward wall 366 and the aft wall 368. A secondary fuel passage 372 can extend radially outward, relative to the fuel nozzle 362, into the forward wall 366. The secondary fuel passage 372 can then pass through the vanes 370 and into the aft wall 368. The secondary fuel passage 372 can extend through the aft wall 368 in the downstream direction, relative to a flow through the swirler 364. The secondary supply of fuel can be injected through an outlet 374, which can be arranged perpendicular to the aft wall 368, or can be arranged at an angle relative to the perpendicular, such as having an axially-aft angle or a tangential component to impart a swirling component to the secondary supply of fuel, which can be co-swirling or counter-swirling with the supply of air from the swirler 364. Injecting the fuel from the radially exterior aft wall 368 provides for increased fuel spread, while centrally maintaining the primary fuel supply.

It should be appreciated that fuels with higher burn temperature and higher burn speeds, or lighter weights relative to air or other fuels, can provide for reducing or eliminating emissions, or improving efficiency without increasing emissions. In one example, hydrogen fuels or hydrogen-based fuels can be utilized, which can eliminate carbon emissions without negative impact to efficiency. Such fuels, including hydrogen, require greater flame control, in order to prevent flame holding or flashback on the combustor hardware. The aspects described herein can increase combustor durability, while current combustors fail to provide durability to utilize such fuels.

It should be appreciated that the examples used herein are not limited specifically as shown, and a person having skill in the art should appreciate that aspects from one or more of the examples can be intermixed with one or more aspect from other examples to define examples that can differ from the examples as shown.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses, a turbine engine comprising: a compressor section, combustor section, and turbine section in serial flow arrangement, with the combustor section including a fuel nozzle assembly comprising: a fuel nozzle including an outer wall surrounding a fuel passage and defining a longitudinal axis; a swirler circumscribing the fuel nozzle defining a swirler passage; a set of vanes provided within the swirler passage; and a secondary fuel passage extending at least partially within the swirler.

The turbine engine of any preceding clause, wherein the secondary fuel passage includes an outlet at the swirler passage.

The turbine engine of any preceding clause, wherein the swirler includes a forward wall and an aft wall.

The turbine engine of any preceding clause, wherein the outlet is provided on the aft wall.

The turbine engine of any preceding clause, wherein the secondary fuel passage passes through the forward wall and at least one vane of the set of vanes to fluidly couple to the outlet on the aft wall.

The turbine engine of any preceding clause, further comprising a splitter separating the swirler passage into a radially exterior passage and a radially interior passage.

The turbine engine of any preceding clause, wherein the secondary fuel passage extends through the splitter.

The turbine engine of any preceding clause, wherein the outlet is provided on the splitter.

The turbine engine of any preceding clause, wherein the outlet exhausts to both the radially interior passage and the radially exterior passage.

The turbine engine of any preceding clause, wherein the fuel passage is configured to supply a hydrogen or hydrogen-based fuel.

The turbine engine of any preceding clause, wherein the secondary fuel passage passes through the outer wall of the fuel nozzle.

The turbine engine of any preceding clause, wherein the secondary fuel passage includes a tangential orientation, arranged at least partially tangent to a radius extending from the longitudinal axis, configured to impart a swirl to a secondary fuel supply through the secondary fuel passage.

The turbine engine of any preceding clause, wherein the swirler is a radial swirler; wherein the fuel nozzle assembly further includes an axial swirler with a set of axial vanes; and wherein the secondary fuel passage passes through the set of axial vanes.

The turbine engine of any preceding clause, wherein the secondary fuel passage is arranged as a plurality of secondary fuel passages in annular arrangement about the fuel nozzle assembly.

The turbine engine of any preceding clause, wherein the secondary fuel passage extends through the set of vanes.

A fuel nozzle assembly comprising: a fuel nozzle including an outer wall encasing a fuel passage and defining a longitudinal axis; an annular swirler circumscribing the fuel nozzle defining a swirler passage; a set of vanes provided within the swirler passage; and a secondary fuel passage extending at least partially through the fuel nozzle outer wall.

The fuel nozzle assembly of any preceding clause, wherein the secondary fuel passage includes an outlet at the swirler passage.

The fuel nozzle assembly of any preceding clause, wherein the secondary fuel passage includes a second outlet at the fuel passage.

The fuel nozzle assembly of any preceding clause, wherein the fuel nozzle includes a nozzle cap with a set of openings, and wherein the outlet at the fuel passage is provided downstream of the nozzle cap relative to a flow direction through the fuel passage.

A method of injecting fuel into a fuel nozzle assembly, the method comprising: emitting a primary flow of fuel through a fuel nozzle; and providing a secondary fuel flow through a secondary fuel passage and injecting the secondary flow of fuel through a secondary fuel passage.

The method of any preceding clause, wherein the secondary fuel passage passes at least partially through the swirler.

The method of any preceding clause, wherein the secondary fuel passage passes at least partially through the fuel nozzle.

A turbine engine comprising: a compressor section, combustor section, and turbine section in serial flow arrangement, with the combustor section including a fuel nozzle assembly comprising: a fuel injector terminating in a fuel tip; a first swirler comprising first swirler passage with a first outlet adjacent to and circumscribing the fuel tip, and a first set of vanes within the first swirler passage; a second swirler comprising a second swirler passage with a second outlet adjacent the first outlet and circumscribing the first outlet, and a second set of vanes within the second swirler passage; wherein the first set of vanes impart a first tangential swirl rate, to flow passing through the first outlet, and the second set of vanes impart a second tangential swirl rate, to flow passing through the second outlet, with the second tangential flow rate being greater than the first tangential flow rate.

A turbine engine comprising: a compressor section, combustor section, and turbine section in serial flow arrangement, with the combustor section including a fuel nozzle assembly comprising: a fuel nozzle including an outer wall surrounding a fuel passage and defining a longitudinal axis; a swirler circumscribing the fuel nozzle defining a swirler passage; and a secondary fuel passage.

The turbine engine of any preceding clause wherein the secondary fuel passage extends through the swirler.

The turbine engine of any preceding clause wherein the secondary fuel passage passes through the outer wall of the fuel nozzle.

The turbine engine of any preceding clause wherein the secondary fuel passage includes a second outlet along the outer wall.

The turbine engine of any preceding clause wherein the second outlet is formed as a set of outlets arranged on both an outer surface of the outer wall and an inner surface of the outer wall.

A turbine engine comprising: a compressor section, combustor section, and turbine section in serial flow arrangement, with the combustor section including a fuel nozzle assembly comprising: a fuel nozzle including an outer wall surrounding a fuel passage and defining a longitudinal axis; a swirler circumscribing the fuel nozzle defining a swirler passage, the swirler including a set of axial vanes and a set of radial vanes; and a secondary fuel passage extending through the set of axial vanes.

The turbine engine of any preceding clause wherein the secondary fuel passage exhausts to the swirler passage downstream of the set of radial vanes.

The turbine engine of any preceding clause wherein the secondary fuel passage branches into multiple secondary fuel passages.

The turbine engine of any preceding clause wherein the secondary fuel passage extend through the outer wall of the fuel nozzle.

What is claimed is:

1. A turbine engine comprising:
    a compressor section, combustor section, and turbine section in serial flow arrangement, defining a rotational axis and extending from forward to aft, with the combustor section including a fuel nozzle assembly comprising:
    a fuel nozzle including an outer wall defining a fuel passage and a longitudinal axis;
    a swirler circumscribing the fuel nozzle and defining a first swirler air passage and a second swirler air passage;
    a vane extending across the first swirler air passage; and
    a secondary fuel passage passing through the vane and exhausting into the second swirler air passage.

2. The turbine engine of claim 1, wherein the secondary fuel passage fluidly couples to the fuel passage.

3. The turbine engine of claim 1, wherein the secondary fuel passage passes through the outer wall of the fuel nozzle.

4. The turbine engine of claim 1, wherein the secondary fuel passage splits to exhaust at a first outlet and a second outlet.

5. The turbine engine of claim 1, wherein the swirler includes an axial swirler, the first swirler air passage is an axial swirler air passage, and the vane is an axial swirler vane.

6. The turbine engine of claim 5, wherein the swirler further includes a radial swirler arranged exterior of the axial swirler, the radial swirler including the second swirler air passage and a radial swirler vane extending across the second swirler air passage.

7. The turbine engine of claim 6, wherein the secondary fuel passage passes through the axial swirler vane and exhausts to the radial swirler air passage.

8. The turbine engine of claim 6, wherein the radial swirler includes a forward wall and an aft wall, and wherein the radial swirler vane extends between the forward wall and the aft wall.

9. The turbine engine of claim 8, wherein the secondary fuel passage extends through the forward wall, through the axial swirler vane, and through the aft wall to exhaust to the second swirler air passage from an outlet at the aft wall.

10. The turbine engine of claim 9, wherein the secondary fuel passage is fluidly isolated from the fuel passage of the fuel nozzle within the fuel nozzle assembly.

11. The turbine engine of claim 9, wherein the fuel nozzle terminates at a nozzle tip, and wherein the outlet for the secondary fuel passage is positioned forward of the nozzle tip.

12. The turbine engine of claim 1, further comprising a nozzle cap positioned within the fuel passage.

13. The turbine engine of claim 12, wherein the fuel nozzle terminates at a nozzle tip, and wherein the nozzle cap is spaced from the nozzle tip.

14. The turbine engine of claim 1, wherein the vane extending across the first swirler air passage includes an axial swirler vane, and the second swirler air passage includes a radial swirler vane.

15. A fuel nozzle assembly for a turbine engine, the fuel nozzle assembly comprising:
   a fuel nozzle including an outer wall defining a fuel passage and a longitudinal axis;
   a swirler circumscribing the fuel nozzle and defining a first swirler air passage and a second swirler air passage;
   a vane extending across the first swirler air passage; and
   a secondary fuel passage passing through the vane and exhausting into the second swirler air passage.

16. The fuel nozzle assembly of claim 15, wherein the secondary fuel passage passes through the outer wall of the fuel nozzle.

17. The fuel nozzle assembly of claim 15, wherein the swirler is an axial swirler, the first swirler air passage is an axial swirler air passage, and the vane is an axial swirler vane.

18. The fuel nozzle assembly of claim 15, wherein the swirler is a radial swirler and includes the second swirler air passage, a forward wall and an aft wall, and wherein the vane extends between the forward wall and the aft wall.

19. The fuel nozzle assembly of claim 15, wherein a vane extending across the first swirler air passage includes an axial swirler vane, and the second swirler air passage includes a radial swirler vane.

20. A fuel nozzle assembly for a turbine engine, the fuel nozzle assembly comprising:
   a fuel nozzle including an outer wall defining a fuel passage and a longitudinal axis;
   an axial swirler circumscribing the fuel nozzle and defining an axial swirler air passage;
   an axial swirler vane extending across the swirler air passage;
   a secondary fuel passage passing through the axial swirler vane; and
   a radial swirler arranged exterior of the axial swirler, the radial swirler including a radial swirler air passage and a radial swirler vane extending across the radial swirler air passage.

* * * * *